United States Patent
Chrisikos et al.

(10) Patent No.: US 9,749,925 B2
(45) Date of Patent: Aug. 29, 2017

(54) SYSTEMS AND METHODS FOR GNSS RAT PRIORITY CONTROL FOR COEXISTENCE OF A GNSS RECEIVER AND ONE OR MORE RAT TRANSCEIVERS

(71) Applicant: QUALCOMM Incorporated, San Diego, CA (US)

(72) Inventors: George Chrisikos, San Diego, CA (US); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 327 days.

(21) Appl. No.: 14/616,545

(22) Filed: Feb. 6, 2015

(65) Prior Publication Data
US 2016/0234748 A1    Aug. 11, 2016

(51) Int. Cl.
*H04W 36/30* (2009.01)
*G01S 19/21* (2010.01)
(Continued)

(52) U.S. Cl.
CPC ........... *H04W 36/30* (2013.01); *G01S 19/21* (2013.01); *H04B 15/00* (2013.01); *H04L 43/065* (2013.01);
(Continued)

(58) Field of Classification Search
CPC ............. H04W 36/30; H04W 72/1215; H04W 28/048; H04W 36/20; H04W 88/06; G01S 19/33
See application file for complete search history.

(56) References Cited

U.S. PATENT DOCUMENTS

2010/0304685 A1   12/2010  Wietfeldt et al.
2012/0207040 A1*  8/2012   Comsa ............ H04W 72/1215
                                              370/252
(Continued)

FOREIGN PATENT DOCUMENTS

EP   2244509 A2   10/2010
GB   2504758 A    2/2014

OTHER PUBLICATIONS

International Search Report and Written Opinion—PCT/US2016/013080—ISA/EPO—Apr. 1, 2016.

*Primary Examiner* — Curtis Odom
(74) *Attorney, Agent, or Firm* — Kilpatrick, Townsend & Stockton, LLP

(57) ABSTRACT

Various arrangements are presented for managing co-existence of a global navigation satellite system (GNSS) receiver with one or more transceivers. A coexistence manager may obtain one or more parameters associated with a first transceiver of the one or more transceivers operating in accordance with a first radio access technology (RAT) and corresponding to an operating event. The first transceiver may be capable of operating in accordance with one or more RATs. The coexistence manager may further determine that the one or more parameters impacts an operation of the GNSS receiver and exceeds a predefined threshold and instruct the first transceiver to perform at least one of selecting a second RAT, changing the one or more parameters or any combination thereof to transmit at least a first portion of a data corresponding to the operating event based on the determination that the one or more parameters impacts the operation of the GNSS receiver.

33 Claims, 8 Drawing Sheets

(51) Int. Cl.

| | |
|---|---|
| *H04L 12/26* | (2006.01) |
| *H04W 24/08* | (2009.01) |
| *H04W 36/20* | (2009.01) |
| *H04B 15/00* | (2006.01) |
| *H04W 72/12* | (2009.01) |
| *H04W 88/06* | (2009.01) |

(52) U.S. Cl.
CPC ........... *H04W 24/08* (2013.01); *H04W 36/20* (2013.01); *H04W 72/1215* (2013.01); *H04W 88/06* (2013.01)

(56) References Cited

U.S. PATENT DOCUMENTS

| | | |
|---|---|---|
| 2013/0201883 A1 | 8/2013 | Wang |
| 2013/0210364 A1 | 8/2013 | Mayor et al. |
| 2013/0242860 A1 | 9/2013 | Kim et al. |
| 2013/0310068 A1 | 11/2013 | Fischer et al. |
| 2013/0331137 A1 | 12/2013 | Burchill et al. |
| 2014/0036882 A1 | 2/2014 | Baghel et al. |

\* cited by examiner

| | Frequency | Power Level | Interference on the GNSS receiver corresponding to receptions from $SV_j$ |
|---|---|---|---|
| RAT1 (e.g., WWAN) Transmit Event | 800 MHz | $P_1$ | $I_1$ |
| RAT2 (e.g., WLAN) Transmit Event | 2.4 GHz | $P_2$ | $I_2$ |
| IM2 corresponding to concurrent operation of RAT1 and RAT2 | 1.6 GHz | $P_3$ | $I_3$ |

FIG. 4

SYSTEMS AND METHODS FOR GNSS RAT PRIORITY CONTROL FOR COEXISTENCE OF A GNSS RECEIVER AND ONE OR MORE RAT TRANSCEIVERS

TECHNICAL FIELD

The present application relates generally to wireless communications, and more particularly to managing coexistence of a global navigation satellite system (GNSS) receiver with one or more radio access technology (RAT) transceivers.

BACKGROUND

When a radio access technology (RAT) transceiver is transmitting data wirelessly via an antenna, a global navigation satellite system (GNSS) receiver located on the same device may or may not be able to process received GNSS signals for performing a location determination. When transmitting, a RAT transceiver may, in some situations, produce a sufficient amount of noise and/or interference that negatively affects the ability of the GNSS receiver to properly receive and process GNSS signals. As a result, performance of the collocated GNSS receiver is degraded during the time that the RAT transceiver is transmitting. The GNSS receiver may be instructed to blank or otherwise ignore GNSS signals received while the RAT transceiver is transmitting. Such arrangements may result in significant periods of time during which a location determination cannot be performed by the GNSS receiver. Such an occurrence may be exacerbated if multiple RAT transceivers are present on the device.

SUMMARY

In one example, a method for managing co-existence of a global navigation satellite system (GNSS) receiver with one or more transceivers is disclosed. The method includes, in part, obtaining one or more parameters associated with a first transceiver of the one or more transceivers operating in accordance with a first radio access technology (RAT) and corresponding to an operating event. The first transceiver is capable of operating in accordance with one or more RATs. The method further includes, in part, determining that the one or more parameters impacts an operation of the GNSS receiver and exceeds a predefined threshold, and instructing the first transceiver to perform at least one of selecting a second RAT, changing the one or more parameters or any combination thereof to transmit at least a first portion of a data corresponding to the operating event based on the determination that the one or more parameters impacts the operation of the GNSS receiver and exceeds the predefined threshold.

In one example, the selecting includes, in part, switching, on the first transceiver, from a first mode of operation corresponding to the first RAT to a second mode of operation corresponding to the second RAT. instructs the first transceiver to perform at least one of selecting a second RAT, changing the one or more parameters or any combination thereof to transmit at least a first portion of a data corresponding to the operating event based on the determination that the one or more parameters impacts the operation of the GNSS receiver and exceeds the predefined threshold.

In one example, the method further includes, in part, instructing a second transceiver to operate in accordance with the second RAT to transmit at least a second portion of the data corresponding to the operating event.

In one example, the first RAT and the second RAT share a common access technology but utilize different operation frequencies. In one example, the GNSS receiver operates during at least a portion of the operating event. In one example, the one or more parameters correspond to concurrent operation of the first transceiver and another transceiver of the one or more transceivers. The other transceiver operates in accordance with a third RAT.

In one example, the operating event is a scheduled operating event in the future, and obtaining the one or more parameters includes, in part, determining the one or more parameters based on a predefined policy. In one example, the operating event is a current operating event, and obtaining the one or more parameters includes, in part, measuring the one or more parameters during the operating event.

In one example, obtaining the one or more parameters include, in part, receiving a report of measurement of the one or more parameters. In one example, the method further includes, in part, determining one or more updated values for the one or more parameters, and instructing the first transceiver to use the updated values for the one or more parameters in an upcoming operating event.

In one example, the first RAT corresponds to a first type of wireless network, and the second RAT corresponds to a second type of wireless network. In one example, the first type of wireless network includes a wireless wide area network (WWAN), and the second type of wireless network includes a wireless local area network (WLAN). In another example, the second RAT corresponds to peer-to-peer communications.

In one example, the first portion of the data corresponding to a first application is offloaded to the second RAT while a second portion of the data corresponding to a second application is transmitted using the first RAT.

In one example, an apparatus for managing co-existence of a GNSS receiver with one or more transceivers is disclosed. The apparatus includes, in part, the GNSS receiver, the one or more transceivers, a memory and at least one processor coupled to the GNSS receiver, the one or more transceivers and the memory. The at least one processor is configured to obtain one or more parameters associated with a first transceiver of the one or more transceivers operating in accordance with a first radio access technology (RAT) and corresponding to an operating event. The first transceiver is capable of operating in accordance with one or more RATs. The at least one processor is further configured to determine that the one or more parameters impacts an operation of the GNSS receiver and exceeds a predefined threshold and instruct the first transceiver to perform at least one of selecting a second RAT, changing the one or more parameters or any combination thereof to transmit at least a first portion of a data corresponding to the operating event based on the determination that the one or more parameters impacts the operation of the GNSS receiver and exceeds the predefined threshold.

In one example, an apparatus for managing co-existence of a GNSS receiver with one or more transceivers is disclosed. The apparatus includes, in part, means for obtaining one or more parameters associated with a first transceiver of the one or more transceivers operating in accordance with a first radio access technology (RAT) and corresponding to an operating event. The first transceiver is capable of operating in accordance with one or more RATs. The apparatus further includes, in part, means for determining that the one or more parameters impacts an operation of the GNSS receiver and exceeds a predefined threshold and means for instructing the first transceiver to perform at least one of selecting a second RAT, changing the one or more parameters or any combination thereof to transmit at least a first portion of a data corresponding to the operating event based on the determination that the one or more parameters impacts the operation of the GNSS receiver and exceeds the predefined threshold.

In one example, a non-transitory processor-readable medium for managing co-existence of a global navigation satellite system (GNSS) receiver with one or more transceivers is disclosed. The processor-readable medium includes, in part, processor-readable instructions configured to cause one or more processors to obtain one or more parameters associated with a first transceiver of the one or more transceivers operating in accordance with a first radio access technology (RAT) and corresponding to an operating event. The first transceiver is capable of operating in accordance with one or more RATs. The processor-readable medium further includes, in part, processor-readable instructions configured to cause one or more processors to determine that the one or more parameters impacts an operation of the GNSS receiver and exceeds a predefined threshold and instruct the first transceiver to perform at least one of selecting a second RAT, changing the one or more parameters or any combination thereof to transmit at least a first portion of a data corresponding to the operating event based on the determination that the one or more parameters impacts the operation of the GNSS receiver and exceeds the predefined threshold.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 4 illustrates a simplified, exemplary table that represents interference data structure that may be maintained by coexistence manager, according to one embodiment of the present disclosure.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims. The word "exemplary" is used herein to mean "serving as an example, instance, or illustration." Any embodiment or design described herein as "exemplary" is not necessarily to be construed as preferred or advantageous over other embodiments or designs.

The term Radio Access Technology (RAT) is used herein to refer to any type of radio technologies used to transmit/receive signals, including but not limited to wireless wide area network (WWAN), wireless local area network (WLAN) and the like.

The term Satellite Positioning System (SPS) is used herein to refer to various types of satellite positioning systems, including different Global Navigation Satellite Systems (GNSS). For example, the SPS system may be a Global Positioning System (GPS), Global Navigation Satellite System (GLONASS), Galileo, Beidou, and/or other type of satellite positioning system. In general, the SPS system may be one or more of these different types of systems used either alone or in conjunction with one another.

A common problem encountered by a mobile device having wireless communication capabilities as well as SPS capabilities is the coexistence of wireless communication and SPS systems within the mobile device. In particular, interference or "desensing," can occur when a mobile device attempts to simultaneously transmit wireless signals and receive SPS signals. The transmission of the wireless signals and/or an intermodulation product arising from such transmission can lead to interference that impacts the proper reception of the SPS signals. For example, the interference may cause a failure to acquire one or more of the SPS signals, corruption of the SPS signals, reduction in the number/frequency of successfully received SPS signals such that SPS-based positioning is degraded, etc. Embodiments of the present invention are directed to managing transmission of wireless signals and reception of the SPS signals by the mobile device in order to address such "desensing" issues.

Figure 1:
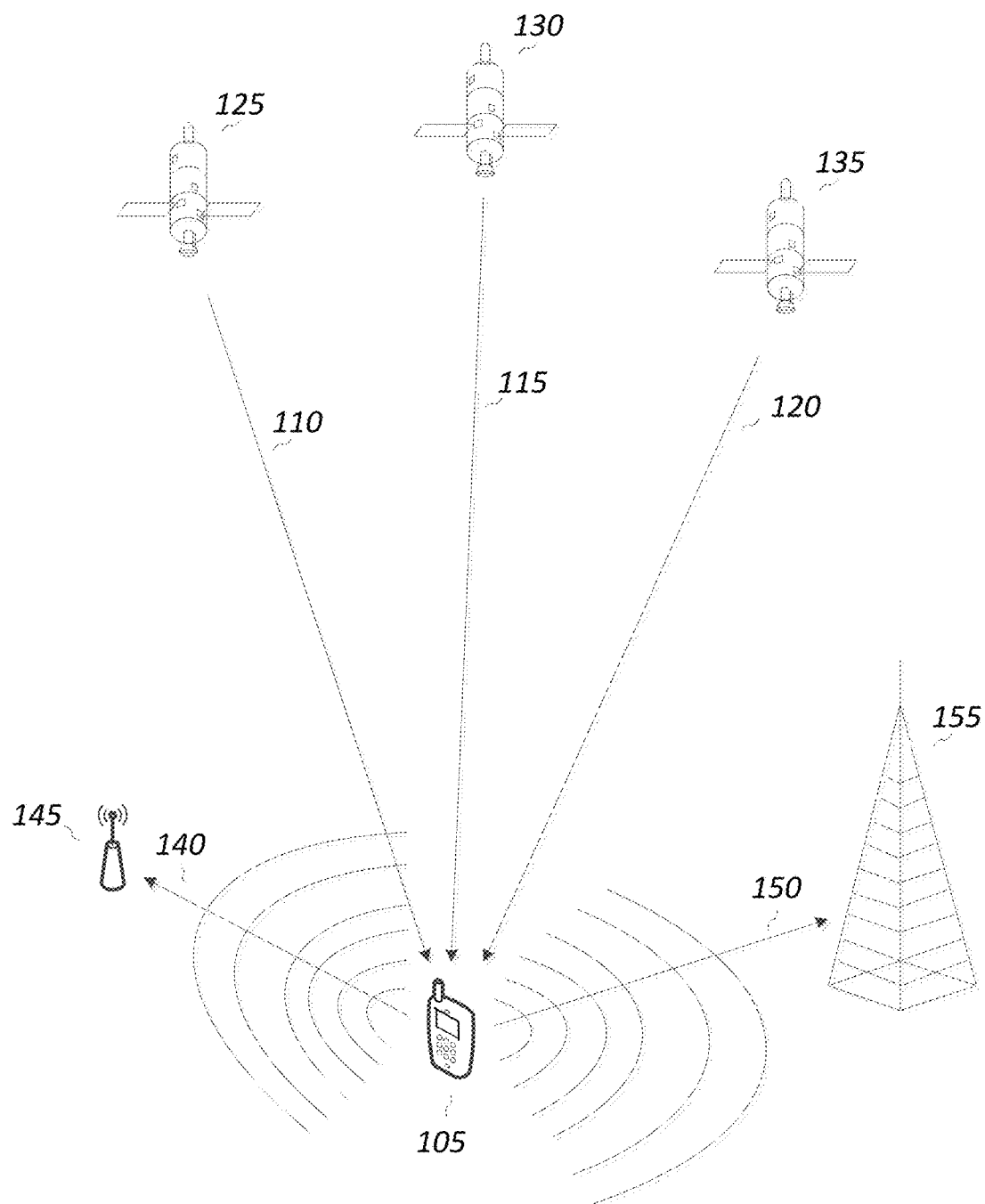
FIG. 1 illustrates a simplified diagram of an environment in which reception of satellite positioning system (SPS) signals by the mobile device may be desensed during transmission of wireless signals by the mobile device, according to one embodiment of the present disclosure.

FIG. 1 illustrates a simplified diagram of an environment 100 in which reception of SPS signals by the mobile device may be desensed during transmission of wireless signals by the mobile device. As shown, environment 100 includes a mobile device 105. Mobile device 105 may be a device designed to perform numerous functions, including the ability to determine its own location based on the reception of SPS signals from satellites.

Mobile device 105 is able to perform satellite-based positioning by receiving SPS signals from one or more satellites. Such satellite-based positioning techniques are well-known and only briefly described below. As shown here, mobile device 105 receives SPS signals 110, 115, and 120 from satellites 125, 130, and 135, respectively. Typically, each of the SPS signals 110, 115, and 120 would include timing information relating to when the SPS signal was transmitted from the respective satellite. Each SPS signal may also include ephemeris information which can be used to determine the location of the satellite at the time the SPS signal is transmitted. Mobile device 105 is able to determine when it receives each of the SPS signals 110, 115, and 120. The transmission time and reception time of each SPS signal may be aligned on a common timing reference, such as a common clock, known to the mobile device 105. By taking the difference between the reception time and transmission time, mobile device 105 may compute the "flight time" associated with each SPS signal, for it to travel from the respective satellite to mobile device 105. The flight time can then be used to compute the distance between each satellite and mobile device, taking into account the speed of light. Once the distance between each satellite and the mobile device is found, trilateration may be used to compute the location of mobile device 105, based on the known location of each satellite and the distance between each satellite and mobile device 105.

In addition to satellite-based positioning, a significant category of functions performed by mobile device 105 relates to wireless communications. Wireless communications may serve as an important link in connecting mobile device 105 over private and/or public networks with other devices such as servers and other user equipment. This may include communication over various types of wireless networks, including wireless local area networks (WLAN) and wide area networks (WAN), among others. Examples of WLANs may be different types of Wi-Fi networks, such as those implemented based on various 802.11 standards. The example in FIG. 1 focuses on wireless communications between mobile devices and base stations. However, other examples of wireless communications may include peer-to-peer communications between mobile devices such as Wi-Fi Direct, Long-Term Evolution (LTE) Direct, etc. Examples of WWAN RATs may include LTE, wideband code division multiple access (WCDMA), and the like. Additional examples of wireless communications may include near field communications (NFC), Bluetooth communications, etc. Embodiments of the present invention, including selection of radio access technologies (RATs) and/or control of transmission of wireless signals to avoid "desensing," may be implemented with different types of wireless communication signals.

In the example shown in FIG. 1, mobile device 105 is able to perform wireless communications by sending signals to, and receiving signals from, one or more base stations 155. For instance, mobile device 105 may send a WLAN signal 140 to an access point 145, which may be a base station supporting WLAN communications. Mobile device 105 may send a WWAN signal 150 to cell tower 155, which may be a base station supporting WWAN communications. For instance, WLAN signal 140 and/or WWAN signal 150 transmitted by mobile device 105 may include an HTTP request for a web page the user of mobile device 105 may wish to retrieve from the Internet. Not shown in FIG. 1 are the wireless signals that mobile device 105 may receive back in response to the request. For example, such signals may be sent to mobile device 105 from access point 145 and/or cell tower 155 and may include an HTTP response containing the HTML file constituting the requested web page. FIG. 1 highlights the wireless signals transmitted from mobile device 105 (as opposed to wireless signals received by mobile device 105), because various embodiments of the present invention addresses techniques to control the scheduling of wireless signal transmissions from the mobile device, to reduce interference caused by such transmitted signals.

For example, if mobile device 105 simultaneously attempts to receive SPS signals such as 110, 115, and 120 and transmit wireless signals such as 140 and 150, interference may occur to "desense" the proper reception of the SPS signals. This can occur if received SPS signals 110, 115, and 120 and transmitted wireless signals 140 and 150 utilize common or overlapping frequencies. The interference may also be caused by spectral emissions from adjacent or close frequency bands. This can also occur even when received SPS signals 110, 115, and 120 and transmitted wireless signals 140 and 150 do not utilize common or overlapping frequencies, but intermodulation products introduce interference.

As mentioned previously, interference can occur when mobile device 105 attempts to simultaneously transmit wireless signals (e.g., one or more WLAN and/or WWAN signals) and receive SPS signals (e.g., GNSS signals). This can result if the wireless signals and the SPS signals utilize common or overlapping frequencies. Interference can also result if the wireless signals and the SPS signals do not utilize common or overlapping frequencies, but intermodulation products (IM) introduce interference. As an example, a GNSS transceiver may operate on 1.5/1.6 GHz frequency band. Therefore, the following IM products may result from concurrent operation of WLAN and WWAN transceivers:
  (A) 800 MHz WWAN and 2.4 GHz WLAN, second order IM product (IM2) falls at 1.6 GHz (e.g., 2.4 GHz-800 MHz),
  (B) 1.7/1.9 GHz WWAN and 5 GHz WLAN, third order IM product falls at 1.6 GHz (e.g., 5 GHz-2×1.7 GHz),
  (C) Long term evolution (LTE) B13/B14 (777-798 MHz uplink), second harmonics falls in the GNSS band (e.g., 2×780 MHz=1600 L1).

As can be seen, even though WLAN signals at 2.4 GHz or 5 GHz and WWAN signals at 800 MHz or 1.7/1.9 GHz may not necessarily utilize the same frequency as GNSS signals at 1.5/1.6 GHz, it is possible for IM products resulting from the mixing of such WLAN and WWAN signals to land in the same frequencies utilized by GNSS signals. Such IM products may thus interfere with and "desense" the proper reception of the GNSS signals. Two of the above examples show IM products resulting from the transmission of signals belonging to different RAT transceivers (WAN and WLAN). The third example shows that interference (e.g., harmonics, IM products) result from the transmission of signals belonging to the same type of system (e.g., LTE only). In general, interference on the GNSS signals may result from transmission of signals belonging to one or more RAT transceivers.

In general, many factors may affect whether a RAT transceiver's transmissions cause substantial interference with the reception of GNSS signals by a GNSS receiver. In some situations, the frequency being used by the RAT transceiver may cause little or no interference with the GNSS receiver. In some situations, the RAT transceiver may be transmitting at a low enough power that the RAT transceiver may cause little or no interference with the GNSS receiver. In other situations, the RAT transceiver's spectral emissions or harmonics may cause interference with the GNSS receiver. When multiple RAT transceivers of a device are transmitting at a same time, various harmonic and/or intermodulation frequencies may be created that can cause interference with the GNSS receiver (as shown above).

Certain embodiments describe techniques to closely coordinate GNSS and RAT operation to mitigate or eliminate the impact of radio transmissions (RFI) within a device on GNSS operation. Current systems are designed such that the GNSS receiver reacts to the RAT transmission issues. For example, if there is strong interference in the GNSS L1 band, the GNSS receiver switches to the GNSS L2 band. In another example, the system may limit WLAN duty cycle to reduce interference on the GNSS receiver. Another scheme is to blank the GNSS receiver when other transceivers in the device are transmitting.

In one embodiment, a coexistence manager instructs one or more of the RATs via reverse messaging or in an a-priori fashion based on knowledge of RAT events to offload some or all of its transmissions to another RAT transceiver in the system, or change its access technology operating mode to a different access technology. For example, the coexistence manager may instruct the WWAN transceiver to offload its data transmission to WLAN transceiver. In one embodiment, RAT control is performed to protect GNSS receiver from interference. For example, reverse messaging is sent by a coexistence manager (CxM) to the Connectivity Engine (CnE) or a high level OS (HLOS) to change the priority of radios (e.g., pick WLAN vs. WWAN) for the purpose of GNSS protection.

Figure 2:
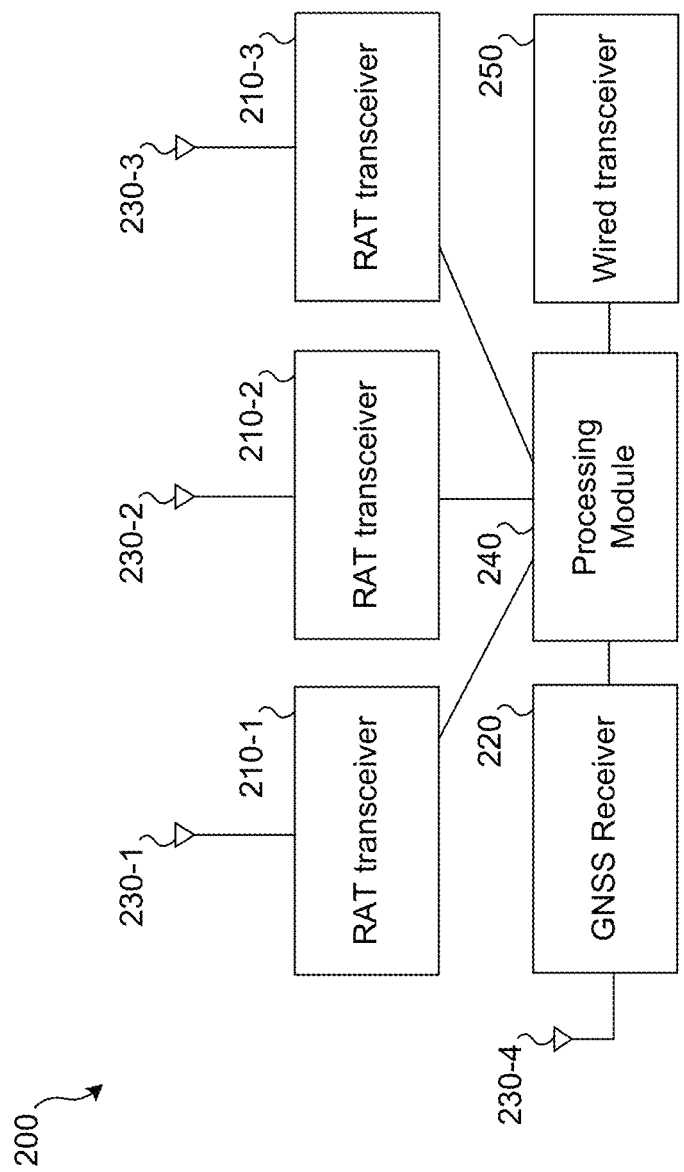
FIG. 2 illustrates an embodiment of a device that includes a global navigation satellite system (GNSS) receiver and multiple radio access technology (RAT) transceivers, according to one embodiment of the present disclosure.

FIG. 2 illustrates an exemplary device 200 that includes a GNSS receiver and multiple RAT transceivers. Device 200 includes three RAT transceivers 210-1, 210-2, and 210-3, GNSS receiver 220, antennas 230-1, 230-2, 230-3, and 230-4, processing module 240, and wired transceiver 250. Device 200 may be a mobile, wireless device. a cellular telephone, a tablet computer, an Internet of Things (Io T) device, a wearable computing device, an automobile, an automotive device, a dedicated GNSS receiver device (e.g., a car navigation device) or any other device that is capable of determining its position using a GNSS receiver and communicating via one or more RAT transceivers.

In device 200, three RAT transceivers 210 are present. At various times, each of these RAT transceivers 210 may transmit signals wirelessly via associated antennas 230. RAT transceivers 210 may be transmitting while no other RAT transceiver is transmitting or may transmit concurrently while one or more other RAT transceivers of RAT transceivers 210 are transmitting. Therefore, at a given time, zero, one, or more than one RAT transceivers of RAT transceivers 210 may be transmitting wireless signals.

Each of RAT transceivers 210 may correspond to at least one wireless technology/protocol. For example, RAT transceiver 210-1 may correspond to one or more of cellular communication protocols, such as 4G LTE, 3G, or GSM. RAT transceiver 210-2 may correspond to one or more wireless local area network protocols such as 802.11a/b/g/ac/ad. RAT transceiver 210-3 may correspond to a device-to-device communication technology/protocol, such as Bluetooth®. In some embodiments, one or more RAT transceivers may correspond to the same technology/protocol. In some embodiments, each of the transceivers may support multiple protocols (e.g., cellular communication protocols, wireless local area network protocols, device-to-device or any other protocols.) While the illustrated embodiment of device 200 contains three RAT transceivers, it should be understood that this is for exemplary purposes only; one, two, or more than three RAT transceivers may be present in alternate embodiments of device 200.

Each of RAT transceivers 210 may be associated with an antenna. RAT transceiver 210-1 may use antenna 230-1 to transmit (and, possibly, receive) wireless signals; RAT transceiver 210-2 may use antenna 230-2 to transmit (and, possibly, receive) wireless signals; and RAT transceiver 210-3 may use antenna 230-3 to transmit (and, possibly, receive) wireless signals. In some embodiments, two or more RAT transceivers of RAT transceivers 210 may share a single antenna. Also, one or more RAT transceivers of RAT transceivers 210 may transmit using two or more antennas. A RAT transceiver of RAT transceivers 210 may be permitted to switch transmission from a first antenna to a second antenna. In some embodiments, it may also be possible that GNSS receiver 220 may share an antenna with one or more RAT transceivers 210.

RAT transceivers 210 may be in communication with processing module 240. The processing module may be an application processor, baseband processor, and/or any other type of processor. Data may be received from processing module 240 for transmission and received data may be provided to processing module 240. Processing module 240 may represent one or more processors in communication with non-transitory processor-readable memory. Processing module 240 may be responsible for execution of a high-level operating system (HLOS) and/or the execution of one or more applications that use one or more RAT transceivers of RAT transceivers 210 to transmit data and/or uses locations determined by GNSS receiver 220.

GNSS receiver 220 may be a standalone component (e.g., a separate integrated circuit chip, such as a radio frequency (RF) chip) or may be a part of a processor of processing module 240. For instance, some processors can have a GNSS receiver onboard. Whether integrated into a multi-purpose processor or a standalone component, GNSS receiver 220 is capable of determining its position based on received GNSS signals. Such GNSS signals may be received via antenna 230-4. Antenna 230-4 may be dedicated to GNSS receiver 220 or may be shared with one or more other components, such as one or more of RAT transceivers 210.

Any of RAT transceivers 210 transmitting may or may not interfere with successful reception and processing of GNSS signals by GNSS receiver 220. Whether any or sufficient interference occurs to affect the performance (e.g., reception and processing) of GNSS receiver 220 may be dependent on various operating characteristics of each RAT transceiver: the frequency on which the RAT transceiver is transmitting, the power level at which the RAT transceiver is transmitting, and/or which antenna the RAT transceiver is using. When two or more RAT transceivers of RAT transceivers 210 are transmitting concurrently, interference at one or more harmonic or intermodulation frequencies may be created that otherwise would not exist. Interference at such frequencies may not be created if each of the RAT transceivers transmitting was transmitting during a different time period. Moreover, transmissions from each of the RAT transceivers may result in interference at harmonics of their transmission frequency.

In addition to interference being caused by RAT transceivers 210, interference on the GNSS receiver may be caused by one or more wired transceivers, such as wired transceiver 250. A wired transceiver 250 may be configured to transmit and/or receive data via a connected wire, such as via a USB3 wired connector and protocol. While a single wired transceiver 250 is depicted in FIG. 2, it should be understood that no wired transceivers or more than one wired transceiver may be present. Wired transceiver 250 may be in communication with processing module 240. Data may be received from processing module 240 for transmission and received data may be provided to processing module 240.

Embodiments detailed herein may be applicable when no RAT transceivers are present or operating. In such embodiments, interference may be caused by other sources, such as power supplies, external devices, and/or other internal componentry.

Whether or not any or sufficient interference occurs to affect the performance of GNSS receiver 220 may be further dependent on the current operating characteristics of GNSS receiver 220. The proximity (distance) between GNSS receiver 220 (and antenna 230-4) to the GNSS space vehicles (SVs) from which GNSS signals are being received and processed may affect how much interference can be tolerated. The GNSS constellation and/or the specific SVs within the constellation being used may affect how interference affects the GNSS receiver because of different frequencies, power levels, SV health, obstructions (due to the direction of the constellation's SVs in relation to the GNSS receiver), and/or orthogonality scheme.

While not illustrated in FIG. 2, communication directly between GNSS receiver 220 and one or more RAT transceivers of RAT transceivers 210 may be possible. Such communication may permit instructions to be sent from GNSS receiver 220 to the one or more RAT transceivers. Further, data may be transmitted from one or more RAT transceivers of RAT transceivers 210 to GNSS receiver 220.

In general, for data offload, the WWAN operator may have policies in place, either at the HLOS or in the connectivity engine (CnE) for radio priority of WWAN or WLAN. These policies may be based on operator billing preferences, best channel, quality of service (QoS), highest throughput, geographic location, time of day, end-to-end internet connectivity, etc. In one embodiment, when GNSS is concurrently used with RAT transceivers, data traffic can be moved on/off of WWAN and/or WLAN to reduce or eliminate interference on the GNSS receiver depending on the interference mechanism, thereby enforcing GNSS priority to the CxM, CnE, or controller.

In one example, a coexistence manager may determine active RATs and their parameters (channel, power, timing, and the like.) Next, the coexistence manager determines if current or scheduled operation of a RAT or multiple RATs with the GNSS receiver impact GNSS reception (e.g., cause interference on the GNSS receiver). The coexistence manager determines if selection of an alternative RAT (LTE, WCDMA, DO, WLAN, etc.) and/or alternative RAT parameters will eliminate or reduce GNSS interference. In one embodiment, the coexistence manager determines if offloading data transmission to WLAN from WWAN, or offloading data transmission to WWAN from WLAN will eliminate or reduce GNSS interference.

In one embodiment, if concurrent WWAN and WLAN operation impacts GNSS reception, the coexistence manager determines if selection of only one of the RAT transceivers (e.g., WWAN or WLAN) can accommodate the data transmission requirements. The coexistence manager selects WWAN or WLAN based on GNSS interference requirements. In this example, instead of two active RATs (which cause IM products) only one active RAT may be used such that IM products are eliminated. For example, if the same traffic was split between WWAN and WLAN transceivers, one of the WWAN or WLAN transceivers may be turned off. The traffic may then be carried on the remaining transceiver. In another example, throughput of the remaining transceiver may be increased to handle the increased traffic.

Figure 3:
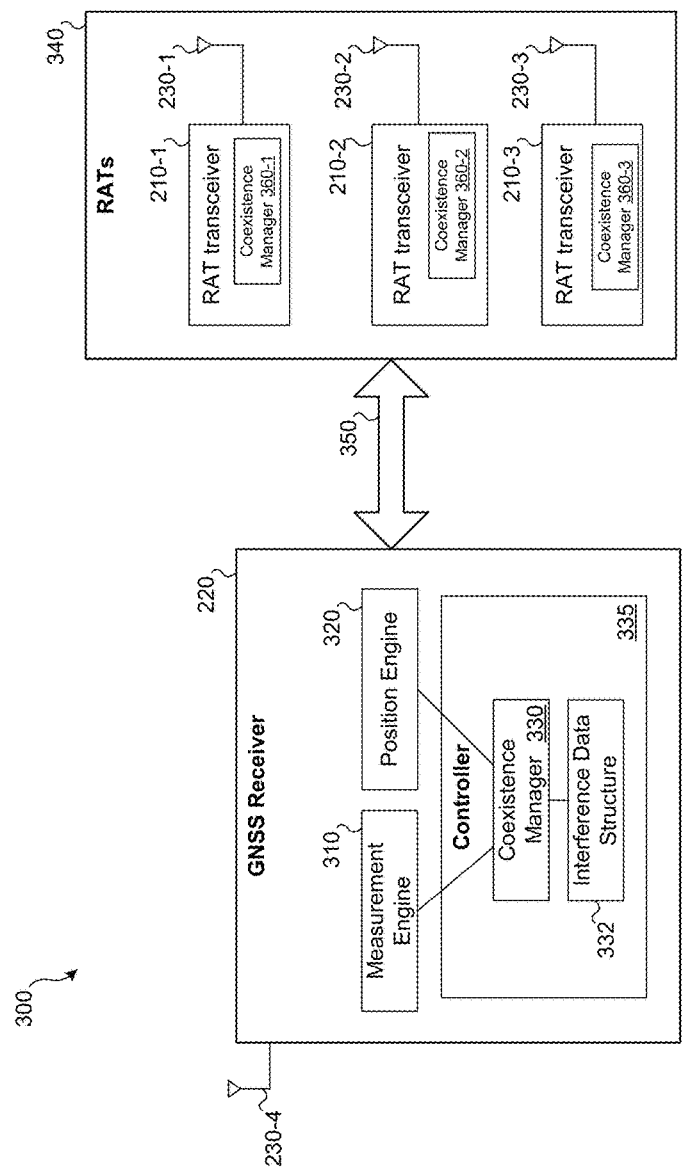
FIG. 3 illustrates an embodiment of a system having a coexistence manager as part of a GNSS receiver, according to one embodiment of the present disclosure.

FIG. 3 illustrates an exemplary embodiment of a device 300, in which the GNSS receiver 220 and/or one or more of the RAT transceivers have coexistence managers, according to one embodiment of the present disclosure. Device 300 may include: GNSS receiver 220, RATs 340, and communication interface 350. Device 300 may represent an embodiment of device 200 of FIG. 2.

As illustrated, RATs 340 include three RAT transceivers 210 and associated antennas 230. One or more of the RAT transceivers 210 may include a coexistence manager 360. For example, RAT transceiver 210-1 may include coexistence manager 360-1, RAT transceiver 210-2 may include coexistence manager 360-2 and RAT transceiver 210-3 may include coexistence manager 360-3. It should be understood that, in other embodiments, fewer or greater numbers of RAT transceivers, antennas and/or coexistence managers may be present. Some or all of RAT transceivers 210 may be configured to receive commands from and/or transmit data to GNSS receiver 220. Some or all RAT transceivers may be configured to provide GNSS receiver 220 information about one or more upcoming transmissions.

The information (which may be referred to as a characteristic) about the one or more upcoming transmissions may include: the time of the start of the transmission, end time of the transmission, and/or time window (also referred to as the time period) of the transmission; an indication of the RAT; the frequency of the transmission; and/or the power level of the transmission. Some or all RAT transceivers may be configured to receive commands from GNSS receiver 220. In one embodiment, the commands may include stopping transmission for a certain amount of time and offloading the transmission event to a different RAT. In another embodiment, the commands may include an allowable transmission power level; one or more allowable frequencies; and/or one or more allowable transmission times for the RAT.

GNSS receiver 220 may include: measurement engine 310, position engine 320, and coexistence manager 330 implemented as part of controller 335. A measurement engine 310 can process the timing data received via an antenna from multiple satellites of one or more global navigation satellite systems. Based on the received timing data, correlators can be used to determine timing information by the measurement engine. Based on the calculated timing information using the correlators, a pseudorange can be determined by measurement engine 310.

The pseudorange calculations made by measurement engine 310 may be output (e.g., to another component, an application being executed, or a high-level operating system) and/or may be passed to position engine 320. Position engine 320, based on the pseudorange calculations from measurement engine 310, may determine a location of GNSS receiver 220 in the form of coordinates. These coordinates may be provided to an application and/or high level operating system being executed by a host processor for use as a location of GNSS receiver 220 or, more generally, as the location of the device 300, such as a cellular phone or tablet computer, or the like.

Coexistence manager 330 may be part of a controller 335 of GNSS receiver 220. In addition to performing other functions, controller 335 may perform the functions of coexistence manager 330. Coexistence manager 330 may serve to manage a GNSS-based location determination such that a location of GNSS receiver 220 can be determined while operation events are occurring at one or more RATs 340.

Coexistence manager 330 may be configured to maintain an interference data structure 355 that indicates an amount of interference experienced by GNSS receiver 220 when various RAT transceiver operating events are occurring. For instance entries may be created and periodically updated in interference data structure 355 that classifies specific operating events at RAT transceivers 210. Entries may be maintained not only for operating events of specific RAT transceivers of RAT transceivers 210, but also for combinations of multiple RAT transceivers of RAT transceivers 210. Such combinations may be important due to additional interference caused by intermodulation effects that can occur when two or more RAT transceivers 210 are transmitting at a same time. Interference data structure 355 may maintain information about the amount of interference received by GNSS receiver 220 when a RAT transceiver is transmitting at specific frequencies and/or specific power levels. Interference data structure 355 may also maintain information about the amount of interference received by GNSS receiver 220 for other forms of operating events performed by RAT transceivers 210 besides transmit events. For instance, receive events may also cause an amount of interference to be experienced by GNSS receiver 220.

FIG. 4 illustrates a simplified, exemplary table that can represent interference data structure 355 that may be maintained by coexistence manager 330. Such a data structure may be maintained for one or more SVs from which the GNSS receiver receives GNSS signals. It should be understood that this table is merely exemplary and other embodiments may contain additional or less information and/or may be maintained in a different format, or be measured in real time on the device.

Many more entries may be present and may be updated as the operating events occur. In one embodiment, for each SV in each GNSS used by the GNSS receiver, a separate table may be maintained. The table illustrated in FIG. 4 provides an entry for each combination of transmitting RATs (e.g., including harmonic and intermodulation effects). Separate entries may be maintained for different transmit frequencies and/or different transmit power levels at which RAT transceivers may operate. It should be understood that for each entry, interference may be created on multiple frequencies, such as due to harmonic frequencies. In addition, a RAT transceiver may transmit using carrier aggregation of multiple bands which could cause intermodulation and cross-modulation between the multiple carriers causing interference to the GNSS receiver. It should be understood that, due to differing operating characteristics of different SVs and GNSSs, interference may vary in effect on different SVs. For instance, a first satellite of a GNSS may be less affected than a second SV of the same or different GNSS due to different operating parameters of the SVs (e.g., the SVs may transmit GNSS signals at different frequencies). In order to create and/or update entries for such an interference data structure, coexistence manager 330 may measure the amount of interference or noise present in the GNSS signals received from a SV when such a RAT operating event is occurring.

In some embodiments, separate tables may be maintained for operating events occurs on multiple RATs at a given time. Therefore, if two RATs are transmitting at a given time, a certain table may be used to determine the likely amount of interference. Various entries may be maintained for different frequencies and/or power levels used for transmitting by such RATs. As another example, a table that includes data for multiple SVs may be maintained for a particular transmit power level of a particular RAT. Therefore, if the single particular RAT is scheduled to transmit at the given power level (and, possibly, frequency) associated with a particular table, that table may be used for determining the likely amount of interference for various SVs. Other variations in storing data used to anticipate the amount of interference that can be expected in various situations are also possible.

In addition to the interference caused by RATs due to effects such as harmonics, nonlinear mixer intermodulation distortion (e.g., due to a wideband transmit by a RAT transmitter), wideband spurious noise from transmit spectral spillage, continuous wave spurs or jammers from coupling mechanisms, and/or local oscillator spurs due to reciprocal mixing may all cause interference to occur in frequency bands on which GNSS signals are received. Data due to such effects may be maintained in a data structure similar to as detailed in relation to FIG. 4.

In some embodiments, rather than having interference data structure 355 that is updated by coexistence manager 330, an interference data structure may be provided to coexistence manager 330 that defines values measured or calculated by another entity. For instance, a manufacturer of GNSS receiver 220 may provide predefined values for such an interference data structure. In one embodiment, the interference data structure is used to determine interference on the GNSS receiver during an upcoming operating event caused by operation of one or more RATs. If the interference is above a predefined threshold, the device may switch to a different RAT to reduce interference on the GNSS receiver. In some embodiments, such predefined values are provided, but can be updated by coexistence manager 330 as noise or interference levels are measured during operation of GNSS receiver 220. In some embodiments, interference data structure 355 may not be stored onboard controller 335, but rather may be stored external to GNSS receiver 220, such as in an accessible non-transitory computer-readable storage medium, such as system memory (e.g., working memory 835 of FIG. 8).

Since an interference data structure is maintained by the coexistence manager, different interference environments can be adapted to. For example, if implemented in cellular phones, the specific interference experienced by the GNSS receiver may vary based on the design of a specific make/model of cellular phone, and it may include handholding/body proximity effects. Use of an interference data structure can allow for the specific interference environment of various makes, models, and types of devices to be adapted to by an interference data structure being maintained (or created) for the device.

Referring back to FIG. 3, GNSS receiver 220 may be configured to communicate with RATs 340 via a communication interface 350, which may utilize serial, parallel, or some other data transmission format. Communication interface 350 may permit information to be transmitted from RATs 340 to GNSS receiver 220. Communication interface may also permit information to be transmitted from GNSS receiver 220 to RATs 340. Some or all of RATs 340 may transmit data to GNSS receiver 220 that indicates one or more characteristics about an operating event that is scheduled to occur. The one or more characteristics transmitted may include an indication of the type of operating event (e.g., a transmit event, a receive event, etc.), the frequency at which the event will occur (if relevant), the power level at which the event will occur (if relevant), and/or a time (and/or duration) at which the event will occur. In some embodiments, at least some of this data may be inferred by GNSS receiver 220 based on the RAT transceiver from which the characteristics were received. For instance, it may be assumed that a transmit event will occur 10 ms after such information was received by GNSS receiver 220 if transmitted by a RAT transceiver that communicates wirelessly with a specific cellular network.

Such information received by GNSS receiver 220 via a communication interface 350 from one or more of RATs 340 may be used by coexistence manager 330 to assess: whether GNSS signals from sufficient SVs will be received, which SVs (of which GNSS) should be used, and/or if a request should be made to one or more RATs, via communication interface 350, to alter one or more upcoming operating events and/or offload the operations to other RAT transceivers.

Coexistence manager 330 may access an interference data structure, such as presented in FIG. 4, to determine if a scheduled event of one or more RATs will sufficiently affect reception of GNSS signals from one or more SVs by GNSS receiver 220. If a measure of interference on the GNSS signals exceeds a threshold, coexistence manager may transmit a command to one or more of RATs 340 to alter one or more upcoming operating events and/or offload their data transmission to other RATs. Such commands may be required to be performed by the RATs or may be in the form of recommendations. If the commands are recommendations, the RAT to which the command is addressed may assess whether it should comply with the command. In some embodiments, an application or high level operating system (HLOS) may provide an indication as to whether RAT operating events or location determination performed by the GNSS receiver 220 should be given priority. If GNSS receiver 220 has priority, the RAT transceiver may be required to abide by a command received from GNSS receiver 220. If the relevant RAT of RATs 340 has priority, the relevant RAT may ignore the command from GNSS receiver 220.

The commands sent by GNSS receiver 220, which are generated by coexistence manger 330, may include instructions to a RAT transceiver regarding: offloading some or all of its data transmission to another RAT, decreasing a transmit power level, delaying (rescheduling) or canceling a transmit, and/or altering a transmit frequency. Such commands may be relevant to various types of operating events of a RAT, such as transmit events and acknowledgements occurring during receive events.

In device 300, a single GNSS receiver 220 is present. It should be understood that, in other embodiments of device 300 (or device 500), multiple GNSS receivers may be present. Two or more GNSS receivers may be present in various embodiments. Such GNSS receivers may be configured to share resources and pseudorange calculations. For example, U.S. patent application Ser. No. 14/163,625, entitled "Method and Systems for Multi-GNSS Operation," filed on Jan. 24, 2014, the entire disclosure of which is hereby incorporated by reference for all purposes, discloses various arrangements for using multiple GNSS receivers in combination.

Figure 5:
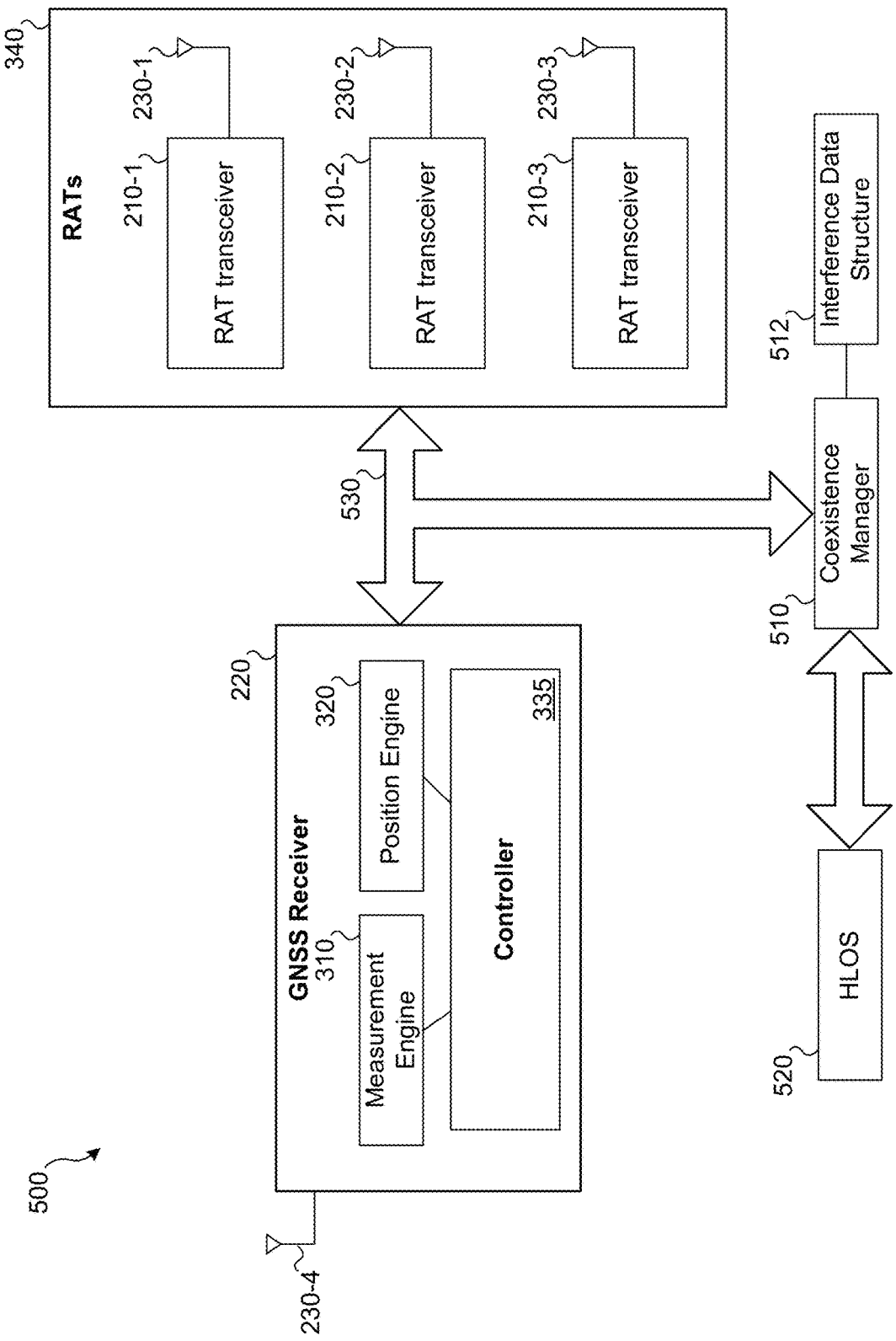
FIG. 5 illustrates an embodiment of a system having a coexistence manager separate from a GNSS receiver, according to one embodiment of the present disclosure.

FIG. 5 illustrates an embodiment of a device 500 having a coexistence manager separate from a GNSS receiver, according to one embodiment of the present disclosure. For instance, GNSS receiver 220 may reside on a first integrated chip and the coexistence manager may reside on a second integrated chip. System 500 may include: GNSS receiver 220, RATs 340, coexistence manager 510, high level operating system (HLOS) 520, and communication interface 530. Device 500 may represent an embodiment of device 200 of FIG. 2.

The components of device 500 may function substantially similarly to device 300 of FIG. 3. For instance, coexistence manager 510 may perform all of the functions of coexistence manager 330. However, rather than the coexistence manager being part of GNSS receiver 220, coexistence manager 510 is separate. In some embodiments, coexistence manager 510 may be implemented as hardware, firmware or software executed by a general-purpose processor. In some embodiments, coexistence manager 510 is executed by the host, which refers to the processor handling executing of the high level operating system. In some embodiments, coexistence manager 510 may be a stand-alone component (e.g., a separate controller) or may be incorporated into another component, such as a specialized or general-purpose processor.

Coexistence manager 510 may receive information about operating events (e.g., current or upcoming) from RATs 340 and may receive information from GNSS receiver 220 about the status of location determination. Coexistence manager 510 may receive information output by controller 335 of GNSS receiver 220 about the received power level of various GNSS signals. Coexistence manager 510 may maintain interference data structure 512 as detailed in relation to coexistence manager 330. Interference data structure 512 may be onboard coexistence manager 510 or may be stored in another location and accessible by coexistence manager 510. In some embodiments, the interference data structure may be maintained by controller 335 of GNSS receiver 220 and coexistence manager 510 may receive information from the controller retrieved from interference data structure 512.

Coexistence manager 510 may communicate with controller 335 of GNSS receiver 220 and RATs 340 via communication interface 530 (or via two separate communication interfaces). Such a communication interface may permit serial, parallel, or some other form of data transmission to occur among the components. In some embodiments, GNSS receiver 220 can receive data from and transmit data to coexistence manager 510; RATs 340 can receive data from and transmit data to coexistence manager 510; however GNSS receiver 220 and RATs 340 may not communicate with each other directly.

Coexistence manager 510 may communicate with a high level operating system (HLOS) 520 and/or one or more applications being executed by HLOS 520. HLOS 520 may instruct coexistence manager 510 whether preference should be given to location determination or to operating events of RATs 340. Based on such instructions from HLOS 520, coexistence manager 510 may instruct RATs 340 to enforce any commands transmitted to RATs 340 on behalf of GNSS receiver 220. Based on instructions from HLOS 520 that indicate preference is to be given to RAT functions, coexistence manager 510 may instruct RATs 340 that commands transmitted to RATs 340 on behalf of GNSS receiver 220 may be optional (e.g., are only enforced if the effect on RATs 340 is minimal). Specific RATs may be given preference over GNSS receiver 220 by HLOS 520; similarly, GNSS receiver 220 may be given priority over specific RATs of RATs 340, such as depending on the applications being executed via HLOS 520. HLOS 520 may provide coexistence manager 510 with specific rules to enforce, such as a rule that indicates that no more than a defined amount of time is to elapse without giving GNSS receiver 220 full preference for location determination. While not illustrated in device 300, it should be understood that coexistence manager 330 may communicate with an HLOS also.

Figure 6:
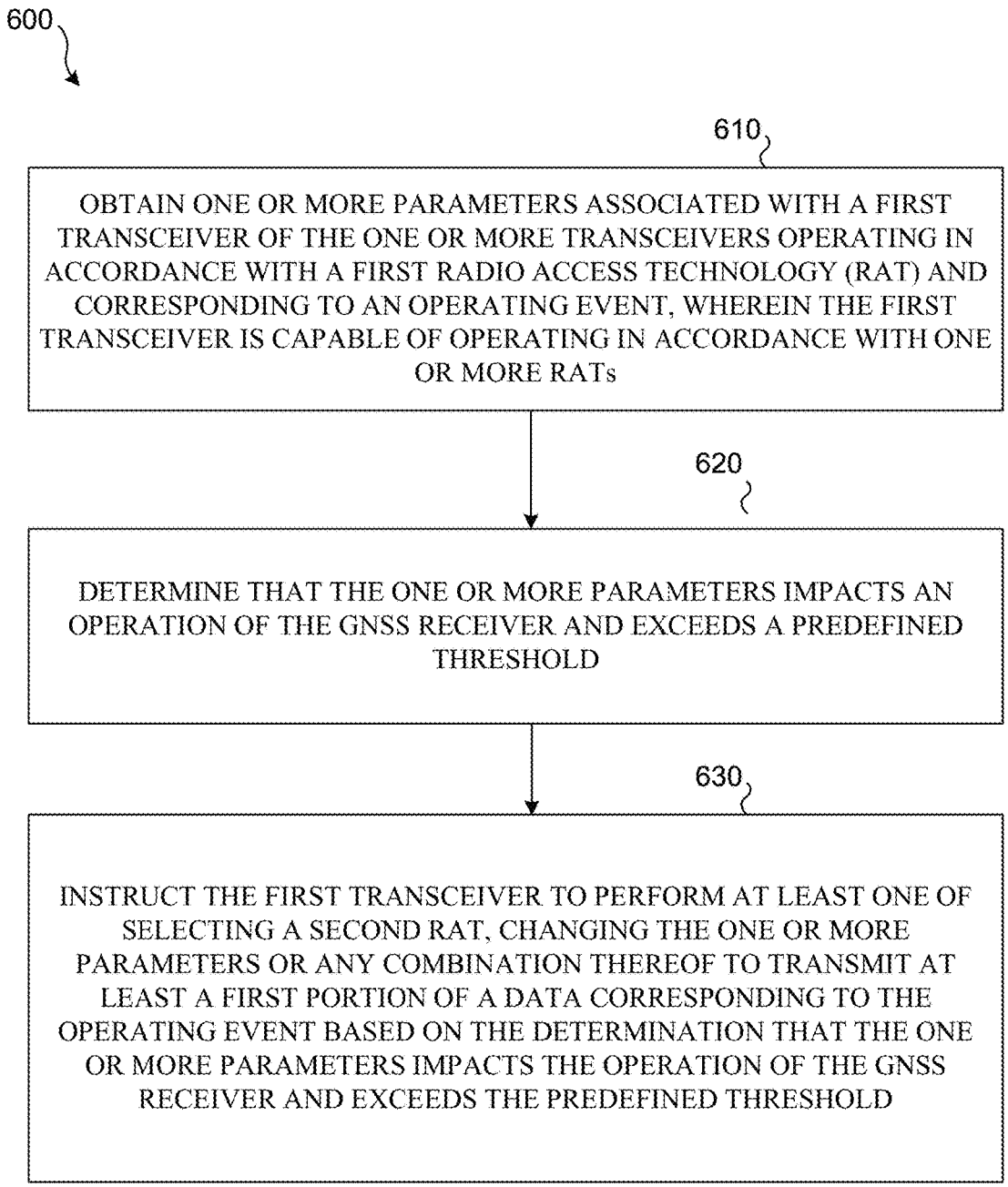
FIG. 6 illustrates an embodiment of a method for managing the coexistence of a GNSS receiver with one or more RAT transceivers, according to one embodiment of the present disclosure.

FIG. 6 illustrates an embodiment of a method 600 for managing coexistence of a GNSS receiver with one or more RAT transceivers. The method 600 may be performed using the devices of FIGS. 2-5. In one embodiment, blocks of method 600 may be performed by a coexistence manager, which may be part of a GNSS receiver (e.g., device 300 of FIG. 3) or may be separate from a GNSS receiver (e.g., device 500 of FIG. 5). If separate from a GNSS receiver, a coexistence manager may be a stand-alone component or may be integrated as part of a processor. Blocks of method 600 may also be performed by a GNSS receiver. Accordingly, means for performing blocks of method 600 can include a coexistence manager implemented on a GNSS receiver or separately, a GNSS receiver, a communication interface, and/or one or more separate processors.

At 610, a coexistence manager obtains one or more parameters associated with a first transceiver of the one or more transceivers operating in accordance with a first radio access technology (RAT) and corresponding to an operating event. The first transceiver may be capable of operating in accordance with one or more radio access technologies (RATs) (e.g., similar or different RATs). In one embodiment, the device may have two or more RAT transceivers. For example, the device may be a mobile device that communicates with a base station through a WWAN transceiver. In addition, the device may communicate with wireless LAN access point (e.g., Wi-Fi) through a WLAN transceiver. In yet another example, the first RAT is a Bluetooth transceiver, a NFC transceiver or any other type of RAT transceivers. The coexistence manager may identify that the WWAN transceiver corresponds to an operating event. In one embodiment, the coexistence manager obtains information about transceivers in the system and determines the one or more parameters associated with the first RAT transceiver based on the obtained information. The coexistence manager may measure some or all of the one or more parameters. Alternatively, some of the parameters may be determined based on a predefined policy, such as a priori knowledge of a transmit event. In yet another example, some of the parameters may be retrieved from interference data structure 512 as illustrated in FIG. 5. In one embodiment, the coexistence manager analyzes the parameters and determines a measure of interference on the GNSS receiver. In yet another embodiment, the coexistence manager receives a report of measurement of interference on the GNSS receiver and determines the one or more parameters based on the report.

At 620, the coexistence manager determines that the one or more parameters impacts an operation of the GNSS receiver and exceeds a predefined threshold. In one example, the one or more parameters may correspond to the interference associated with operation of the first transceiver in accordance with a first RAT during the operating event.

At 630, the coexistence manager instructs the first transceiver to perform at least one of selecting a second RAT, changing the one or more parameters or any combination thereof to transmit at least a first portion of a data corresponding to the operating event based on the determination that the one or more parameters impacts the operation of the GNSS receiver and exceeds the predefined threshold.

In one embodiment, the coexistence manger instructs the first transceiver to switch from a first mode of operation corresponding to the first RAT to a second mode of operation corresponding to the second RAT. In another embodiment, the device switches from using the first transceiver to operate in accordance with the first RAT to using a second transceiver to operate in accordance with the second RAT. As an example, a mobile device may include a WLAN transceiver and a WWAN transceiver. During an operating event, the mobile device may be performing a high-traffic file transfer using the WLAN transceiver. The transmissions from the WLAN transceiver, alone or with the concurrent transmission of another RAT (e.g., such as a WWAN transceiver), may cause significant interference (e.g., higher than a predefined threshold) on the reception of GNSS signals. In this example, the coexistence manager may inform the WLAN transceiver to offload the data transmission to the WWAN transceiver to reduce interference on the GNSS receiver. In another example, the coexistence manager may inform the WLAN transceiver to offload the data transmission to a different RAT transceiver, such as a different WLAN transceiver in the device, a peer-to peer transceiver (e.g., Bluetooth), or any other type of RAT transceivers to reduce interference on the GNSS receiver.

In another example, the device may have a WWAN transceiver whose operation causes interference on the GNSS receiver. The coexistence manager may inform the WWAN transceiver to offload some or all of its data transfer to a WLAN transceiver to reduce interference on the GNSS receiver.

In one embodiment, the first RAT and the second RAT may share a common access technology but utilize different operation frequencies. For example, the first RAT may correspond to WLAN with frequency $f_1$, and the second RAT corresponds to WLAN with frequency $f_2$.

In one embodiment, a first portion of the data corresponding to a first application is offloaded to a second RAT transceiver while a second portion of the data corresponding to a second application is transmitted using the first RAT transceiver. As an example, if the mobile device is performing a high-traffic file transfer using the WLAN transceiver for a first application (e.g., uploading a video to a server), while concurrently transmitting voice over IP packets to the server using the WLAN transceiver for a second application. The coexistence manager may inform the WLAN transceiver to offload the high-traffic file-transfer to the WWAN transceiver while keeping the voice over IP packet transfer on the WLAN transceiver. Alternatively, the coexistence manager may inform the WLAN transceiver to offload both the file transfer and the voice over IP packet transfer to the WWAN transceiver. In yet another example, the coexistence manager may decide to utilize two different RAT transceivers for transmission of different portions of data. In this case, the high-traffic file transfer may be offloaded to WWAN transceiver while the VOIP packet transfer is offloaded to a different RAT (e.g., Bluetooth, etc.)

In one embodiment, a Bluetooth transceiver causes interference on the GNSS receiver. For example, the Bluetooth transceiver acts as a radio aggressor in the 2.4 GHz band that can impact GNSS either directly, or indirectly via intermodulation products with other RATs. It should be noted that although the examples described herein mostly refer to WWAN and/or WLAN transceivers, in general, these techniques may be used in accordance with any type of RAT (e.g., Bluetooth, NFC, WLAN, WWAN, or the like) without departing from the teachings of the present disclosure.

In one embodiment, the coexistence manager may determine a second set of parameters for the first RAT to reduce amount of interference on the GNSS receiver. For example, the coexistence manager may define a different operating frequency, power level, or time duration for the first transceiver. The coexistence manager may determine if the measure of interference is reduced if the first RAT transceiver uses the second set of parameters during the second operating event. If yes, the coexistence manager sends the second set of parameters to the first RAT to be used during the operating event.

In one embodiment, the operating event may be a scheduled operating event in the future. For example, the first RAT may send information corresponding to its scheduled operating events in the future to the coexistence manager. The coexistence manager may then calculate expected interference on the GNSS receiver during the scheduled operating event using a predefined policy (e.g., interference data structure as illustrated in FIG. 4). In another embodiment, the operating event may correspond to a current transmission event. In this case, the coexistence manager may measure one or more parameters and determine the measure of interference on the GNSS receiver. The coexistence manager may use the obtained information to decide whether or not a switch between different RATs in the device is beneficial for the GNSS receiver.

In one embodiment, the coexistence manager resides on the mobile device. Therefore, the coexistence manager is able to obtain information about various RAT transceivers operating on the device and decide whether or not to offload transmissions from one RAT transceiver to another RAT transceiver to reduce interference on the GNSS receiver.

Figure 7:
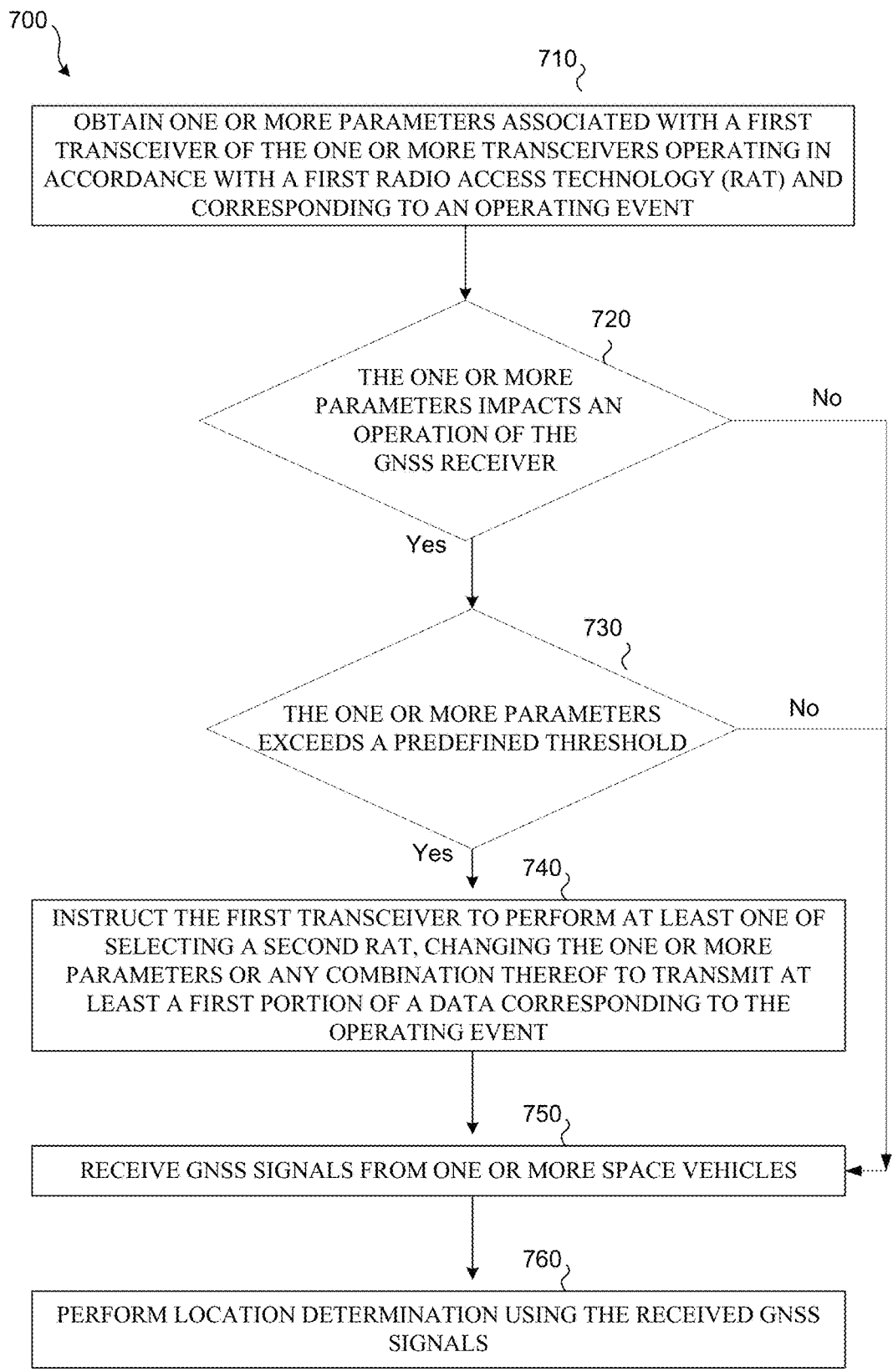
FIG. 7 illustrates an embodiment of a method 700 that may be performed by a device for managing coexistence of a GNSS receiver with one or more RAT transceivers.

FIG. 7 illustrates an embodiment of a method 700 that may be performed by a device for managing coexistence of a GNSS receiver with one or more RAT transceivers. The method 700 may be performed using the devices of FIGS. 2-4. At 710, the device obtains one or more parameters associated with a first transceiver of the one or more transceivers operating in accordance with a first radio access technology (RAT) and corresponding to an operating event. The first transceiver is capable of operating in accordance with one or more RATs. The one or more parameters may correspond to interference associated with operation of the first transceiver in accordance with a first RAT during the operating event. In one embodiment, the device determines the parameters based on a predefined policy. For example, the device retrieves the parameters from memory and/or calculates one or more of the parameters. In another embodiment, the device measures some or all of the parameters corresponding to transmissions from at least one of the first RAT transceivers. In yet another embodiment, the device measures a first portion of the parameters and calculates a second portion of the parameters. At 720, the device determines if the one or more parameters impacts an operation of the GNSS receiver.

At 730, the device determines if the one or more parameters exceeds a predefined threshold. If the one or more parameters impacts an operation of the GNSS receiver and exceeds a predefined threshold, at 740, the device instructs the first transceiver to perform at least one of selecting a second RAT, changing the one or more parameters or any combination thereof to transmit at least a first portion of a data corresponding to the operating event. At 750, the device receives GNSS signals from one or more space vehicles. At 760, the device performs location determination using the received GNSS signals.

In one embodiment, the device may have more than one (e.g., multi-constellation) GNSS receivers. In one example, one or more of the GNSS receivers may be subject to interference from other RATs. Depending on the circumstances, different GNSS receivers may be impacted the same or differently by the other RATs. For example, a first GNSS receiver may experience coexistence interference from other RATs while a second GNSS receiver may not be impacted or experience smaller interference. For instance, the second GNSS receiver may be directed to search a set of GNSS constellations which are not impacted by the interference (e.g., operate at downlink frequencies that are not impacted). Other parameters such as direction of antennas corresponding to each GNSS receiver, operating times, and the like can change impact of coexistence interference on each GNSS receiver. The techniques described herein may be used to reduce interference on one or more of the GNSS receivers.

Figure 8:
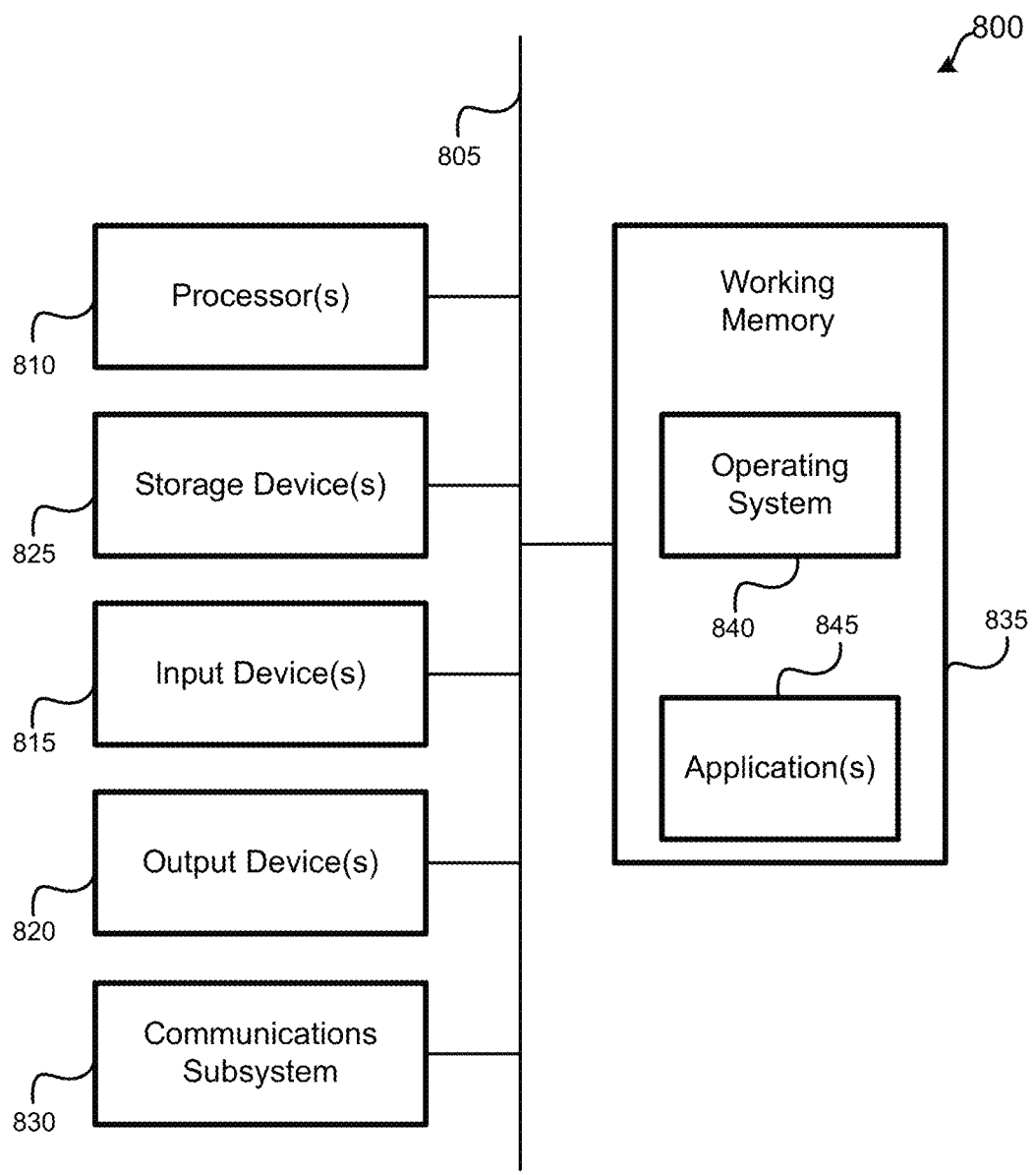
FIG. 8 illustrates an embodiment of a computer system, according to one embodiment of the present disclosure.

FIG. 8 provides a schematic illustration of one embodiment of a computer system 800 that can perform various blocks of the methods provided by various embodiments. A computer system as illustrated in FIG. 8 may be incorporated as part of the previously described computerized devices, such as devices 200, 300, and 500. For instance, functions of a coexistence manager may be performed by a general-purpose processor implemented as part of computer system 800. Further, devices 200, 300, and 500 may reside on a computerized mobile device, such as a tablet computer or cellular phone that contains computer system 800. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, video decoders, and/or the like); one or more input devices 815, which can include without limitation a mouse, a keyboard, remote control, and/or the like; and one or more output devices 820, which can include without limitation a display device, a printer, and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset (such as a Bluetooth™ device, an 802.11 device, a Wi-Fi device, a WiMax device, cellular communication device, GSM, CDMA, WCDMA, LTE, LTE-A, LTE-U, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the non-transitory storage device(s) 825. Merely by way of example, execution of the sequences of instructions contained in the working memory 835 might cause the processor(s) 810 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 (and/or components thereof) generally will receive signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a non-transitory storage device 825 either before or after execution by the processor(s) 810.

It should further be understood that the components of computer system 800 can be distributed across a network. For example, some processing may be performed in one location using a first processor while other processing may be performed by another processor remote from the first processor. Other components of computer system 800 may be similarly distributed. As such, computer system 800 may be interpreted as a distributed computing system that performs processing in multiple locations. In some instances, computer system 800 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for managing co-existence of a global navigation satellite system (GNSS) receiver with one or more transceivers, comprising:
obtaining one or more parameters corresponding to an operating event and associated with a first transceiver of the one or more transceivers, the first transceiver operating in accordance with a first radio access technology (RAT) during at least a first portion of the operating event, wherein the first transceiver is capable of operating in accordance with one or more RATs;
determining, based on the one or more parameters and an interference data structure, that the first transceiver operating in accordance with the first RAT during the first portion of the operating event impacts an operation of the GNSS receiver and the impact exceeds a predefined threshold, wherein the interference data structure indicates an amount of interference present in a GNSS signal received by the GNSS receiver from a respective GNSS space vehicle (SV) of one or more GNSS SVs during a RAT operating event; and
instructing the first transceiver to perform at least one of selecting a second RAT, changing the one or more parameters or any combination thereof to transmit at least a first portion of data corresponding to the operating event based on the determination that the impact exceeds the predefined threshold.

2. The method of claim 1, wherein the selecting comprises:
switching, on the first transceiver, from a first mode of operation corresponding to the first RAT to a second mode of operation corresponding to the second RAT.

3. The method of claim 1, further comprising:
instructing a second transceiver to operate in accordance with the second RAT to transmit at least a second portion of the data corresponding to the operating event.

4. The method of claim 1, wherein the first RAT and the second RAT share a common access technology but utilize different operation frequencies.

5. The method of claim 1, wherein the GNSS receiver operates during at least a second portion of the operating event.

6. The method of claim 1, wherein the one or more parameters correspond to concurrent operation of the first transceiver and another transceiver of the one or more transceivers, wherein the other transceiver operates in accordance with a third RAT, and wherein the interference data structure includes an entry indicating an amount of interference in the GNSS signal caused by an intermodulation between a signal transmitted by the first transceiver in accordance with the first RAT and a signal transmitted by the second transceiver in accordance with the third RAT.

7. The method of claim 1, wherein the operating event is a scheduled operating event in the future, and wherein obtaining the one or more parameters comprises:
determining the one or more parameters based on a predefined policy.

8. The method of claim 1, wherein the operating event is a current operating event, and wherein obtaining the one or more parameters comprises:
measuring the one or more parameters during the operating event.

9. The method of claim 1, wherein obtaining the one or more parameters comprises:
receiving a report of measurement of the one or more parameters.

10. The method of claim 1, further comprising:
determining one or more updated values for the one or more parameters; and
instructing the first transceiver to use the updated values for the one or more parameters in an upcoming operating event.

11. The method of claim 1, wherein the first RAT corresponds to a first type of wireless network, and the second RAT corresponds to a second type of wireless network.

12. The method of claim 11, wherein the first type of wireless network comprises a wireless wide area network (WWAN), and the second type of wireless network comprises a wireless local area network (WLAN).

13. The method of claim 1, wherein the second RAT corresponds to peer-to-peer communications.

14. The method of claim 1, wherein a first portion of data corresponding to a first application is offloaded to the second RAT while a second portion of data corresponding to a second application is transmitted using the first RAT.

15. The method of claim 1, wherein the interference data structure includes an entry associated with an interference caused by an intermodulation of signals in accordance with one or more RATs, an interference caused by wideband spurious noise from transmit spectral spillage, continuous wave spurs or jammers from coupling mechanisms, or local oscillator spurs due to reciprocal mixing.

16. The method of claim 1, wherein the interference data structure includes a separate table for each GNSS SV from which the GNSS receiver receives GNSS signals.

17. The method of claim 1, wherein the amount of interference present in the GNSS signals received from the respective GNSS SV during the RAT operating event is a function of a frequency, a power level, SV health, obstructions, or an orthogonality scheme of the respective GNSS SV.

18. An apparatus for managing co-existence of a global navigation satellite system (GNSS) receiver with one or more transceivers, comprising:
the GNSS receiver;
the one or more transceivers;
a memory; and
at least one processor coupled to the GNSS receiver, the one or more transceivers and the memory, wherein the at least one processor is configured to:
obtain one or more parameters corresponding to an operating event and associated with a first transceiver of the one or more transceivers, the first transceiver operating in accordance with a first radio access technology (RAT) during at least a first portion of the operating event, wherein the first transceiver is capable of operating in accordance with one or more RATs;

determining, based on the one or more parameters and an interference data structure, that the first transceiver operating in accordance with the first RAT during the first portion of the operating event impacts an operation of the GNSS receiver and the impact exceeds a predefined threshold, wherein the interference data structure indicates an amount of interference present in a GNSS signal received by the GNSS receiver from a respective GNSS space vehicle (SV) of one or more GNSS SVs during a RAT operating event; and instruct the first transceiver to perform at least one of selecting a second RAT, changing the one or more parameters or any combination thereof to transmit at least a first portion of data corresponding to the operating event based on the determination that the impact exceeds the predefined threshold.

19. The apparatus of claim 18, wherein the at least one processor is further configured to instruct the first transceiver to switch from a first mode of operation corresponding to the first RAT to a second mode of operation corresponding to the second RAT.

20. The apparatus of claim 18, wherein the at least one processor is further configured to:
instruct a second transceiver to operate in accordance with the second RAT to transmit at least a second portion of the data corresponding to the operating event.

21. The apparatus of claim 18, wherein the first RAT and the second RAT share a common access technology but utilize different operation frequencies.

22. The apparatus of claim 18, wherein the GNSS receiver operates during at least a second portion of the operating event.

23. The apparatus of claim 18, wherein the one or more parameters correspond to concurrent operation of the first transceiver and another transceiver of the one or more transceivers, wherein the other transceiver operates in accordance with a third RAT.

24. The apparatus of claim 18, wherein the operating event is a scheduled operating event in the future, and wherein the at least one processor is further configured to determine the one or more parameters based on a predefined policy.

25. The apparatus of claim 18, wherein the operating event is a current operating event, and wherein the at least one processor is further configured to measure the one or more parameters during the operating event.

26. The apparatus of claim 18, wherein the at least one processor is further configured to:
receive a report of measurement of the one or more parameters.

27. The apparatus of claim 18, wherein the at least one processor is further configured to:
determine one or more updated values for the one or more parameters; and
instruct the first transceiver to use the updated values for the one or more parameters in an upcoming operating event.

28. The apparatus of claim 18, wherein the first RAT corresponds to a first type of wireless network, and the second RAT corresponds to a second type of wireless network.

29. The apparatus of claim 28, wherein the first type of wireless network comprises a wireless wide area network (WWAN), and the second type of wireless network comprises a wireless local area network (WLAN).

30. The apparatus of claim 18, wherein the second RAT corresponds to peer-to-peer communications.

31. The apparatus of claim 18, wherein a first portion of data corresponding to a first application is offloaded to the second RAT while a second portion of data corresponding to a second application is transmitted using the first RAT.

32. An apparatus for managing co-existence of a global navigation satellite system (GNSS) receiver with one or more transceivers, comprising:
means for obtaining one or more parameters corresponding to an operating event and associated with a first transceiver of the one or more transceivers, the first transceiver operating in accordance with a first radio access technology (RAT) during at least a portion of the operating event, wherein the first transceiver is capable of operating in accordance with one or more RATs;
means for determining, based on the one or more parameters and an interference data structure, that the first transceiver operating in accordance with the first RAT during the portion of the operating event impacts an operation of the GNSS receiver and the impact exceeds a predefined threshold, wherein the interference data structure indicates an amount of interference present in a GNSS signal received by the GNSS receiver from a respective GNSS space vehicle (SV) of one or more GNSS SVs during a RAT operating event; and
means for instructing the first transceiver to perform at least one of selecting a second RAT, changing the one or more parameters or any combination thereof to transmit at least a first portion of data corresponding to the operating event based on the determination that the impact exceeds the predefined threshold.

33. A non-transitory processor-readable medium for managing co-existence of a global navigation satellite system (GNSS) receiver with one or more transceivers, comprising processor-readable instructions configured to cause one or more processors to:
obtain one or more parameters corresponding to an operating event and associated with a first transceiver of the one or more transceivers, the first transceiver operating in accordance with a first radio access technology (RAT) during at least a portion of the operating event, wherein the first transceiver is capable of operating in accordance with one or more RATs;
determine, based on the one or more parameters and an interference data structure, that the first transceiver operating in accordance with the first RAT during the portion of the operating event impacts an operation of the GNSS receiver and the impact exceeds a predefined threshold, wherein the interference data structure indicates an amount of interference present in a GNSS signal received by the GNSS receiver from a respective GNSS space vehicle (SV) of one or more GNSS SVs during a RAT operating event; and
instruct the first transceiver to perform at least one of selecting a second RAT, changing the one or more parameters or any combination thereof to transmit at least a first portion of data corresponding to the operating event based on the determination that the impact exceeds the predefined threshold.

* * * * *